No. 793,824. PATENTED JULY 4, 1905.
J. V. CULLINEY.
BOLT AND NUT LOCK.
APPLICATION FILED DEC. 15, 1904.
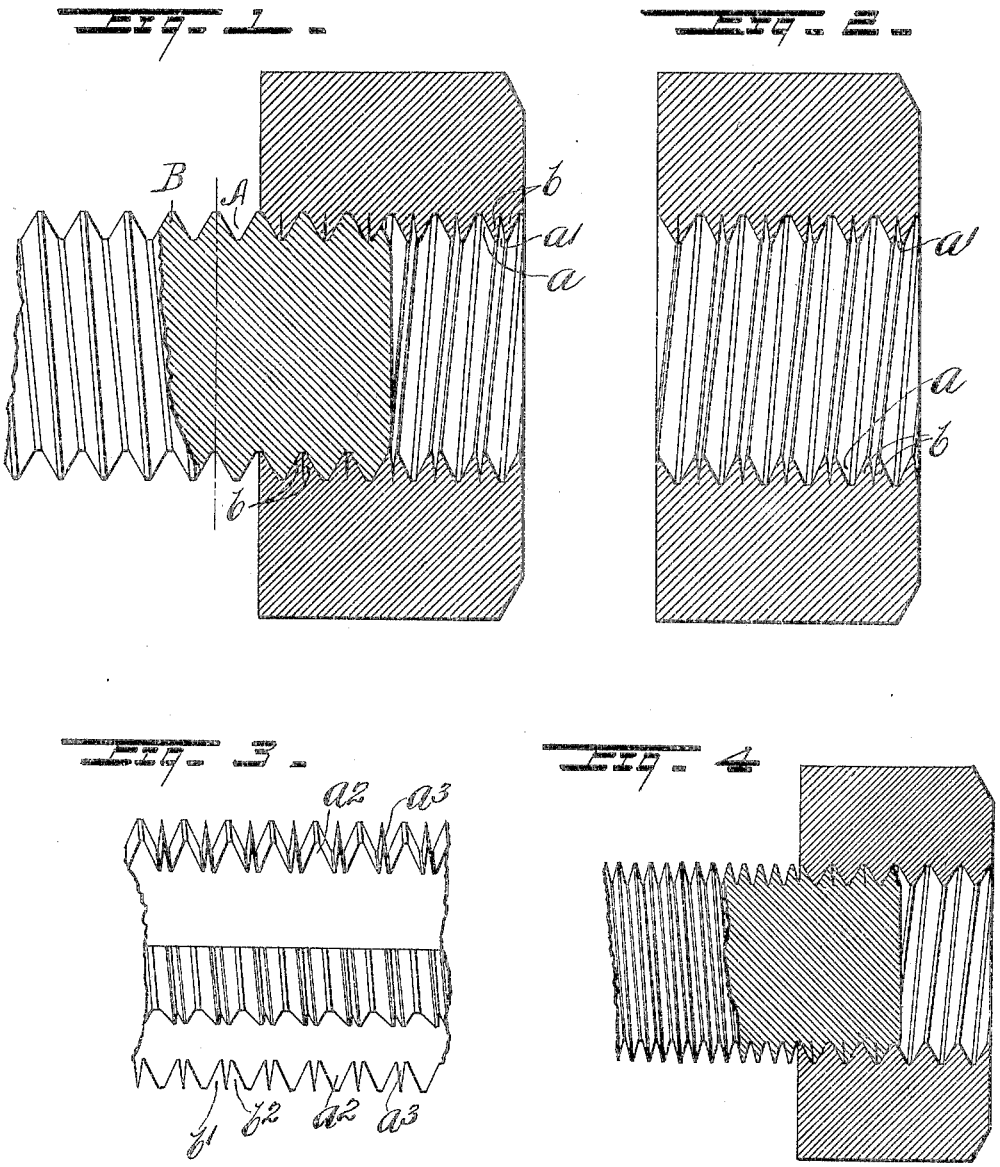
John V. Culliney
Inventor No. 793,824.

Patented July 4, 1905.

UNITED STATES PATENT OFFICE.

JOHN V. CULLINEY, OF LEBANON, PENNSYLVANIA, ASSIGNOR TO AMERICAN IRON AND STEEL MANUFACTURING CO., INC., OF LEBANON, PENNSYLVANIA.

BOLT AND NUT LOCK.

SPECIFICATION forming part of Letters Patent No. 793,824, dated July 4, 1905.

Application filed December 15, 1904. Serial No. 236,926.

*To all whom it may concern:*

Be it known that I, JOHN V. CULLINEY, a citizen of the United States, residing in Lebanon, county of Lebanon, State of Pennsylvania, have invented certain new and useful Improvements in Bolt and Nut Locks, of which the following is a specification.

My invention relates to that class of bolts and nuts in which the threads are so proportioned relatively as to cause the screws to jam or lock in forcibly engaging them, so to prevent unintentional relative movement, and more particularly to that type in which the threads of the complementary screws are of like pitch, but of different shape in cross-section.

My invention consists in providing one of the engaging screws, preferably the nut, with an abnormally-shaped thread adapted to be practically conformed to the normally-shaped thread of the other screw when forcibly engaged with the latter, the abnormally-shaped thread being of greater width than the intervening groove, but having yielding sides adapted to be forcibly closed together by the engaging thread, so that both the threads and the grooves of the engaging parts will be practically conformed, the parts, however, being firmly retained in adjusted relative position by the resulting friction and the resilience of the pressed-together sides of the thread.

The invention is fully described in connection with the accompanying drawings and is specifically pointed out in the claims.

Figure 1 shows in central longitudinal section a partially-engaged bolt and nut embodying my invention, the disengaged portions showing the original shape of the respective threads and the engaged portions indicating the change of shape resulting from forcing the nut upon the bolt. Fig. 2 is a separate view of the nut, certain of the divided threads being indicated as closed together partially or wholly in the process of manufacture to facilitate starting the nut upon a bolt. Fig. 3 shows a portion of a thread-cutting tool adapted for tapping the nut shown in Figs. 1 and 2. Fig. 4 shows a modification in which the divided thread is formed upon the bolt and an ordinary thread in the nut, the dividing-groove being shown of the same size and shape as the groove between the threads.

As shown in Fig. 1, the bolt is provided with a V-thread of United States standard shape throughout, the pitch, however, being exaggerated for clearness of illustration, while the nut is provided with a double or divided thread of the same pitch and same height as the bolt-thread and the separated parts of which have approximately the same total area of cross-section as the single solid thread of the bolt and are capable of being forcibly bent or deflected toward each other, so as to form jointly an approximately solid thread of substantially the same shape and size as the bolt-thread and as the intervening groove of the nut when enlarged by the forcible engagement of the latter, as indicated.

The dividing-groove $a'$, which separates the two parts $b\ b$ of the nut-thread shown in Figs. 1 and 2, is smaller than the main groove $a$ between the convolutions of the divided thread, so that the separated parts $b\ b$ may be pressed together with as little expenditure of power as is required to insure the proper gripping of the bolt and nut threads. The combined cross-sectional areas of the dividing-groove $a'$ and of the main groove $a$ is approximately equal to that of the groove A of the bolt-thread, and the total cross-sectional area of the divided thread, including the two similar parts $b\ b$, is approximately equal to that of the thread B of the bolt, and when said parts $b\ b$ are pressed together in forcing the nut upon the bolt they jointly form a substantially solid thread similar to the bolt-thread B and snugly crowded into the bolt-groove A, while the main groove $a$ is at the same time forcibly enlarged, so as to conform with the bolt-thread B, so that when the nut is fully engaged with the bolt the nut-thread and groove are both forcibly conformed to the bolt-thread and groove or, in other words, are forced into normal shape, so that both the bolt and nut threads will appear in central longitudinal section the same as an ordinary bolt and nut. It is obvious, however, that in thus forcibly changing the original shape of the nut-thread to conform with the bolt-thread a strong gripping action between the two threads is assured, and inasmuch as the natural resilience of the metal in the originally-separated thread parts will constantly tend to spread said parts such gripping action will not only be insured while the parts are retained in engagement, but will also permit the forcible removal of the nut and its subsequent reëngagement with the bolt without losing the gripping action, though such action may be reduced by thus repeatedly applying the nut.

While I generally prefer to provide the nut-screw with my divided thread, it is evident that the same result may be obtained by providing it on the bolt instead and using in connection therewith a nut with the ordinary solid thread, as indicated in Fig. 4, and while it is preferable that the dividing-groove between the thread parts should be reduced so as not to unnecessarily spread said parts, and thereby require the application of undue force to bend or deflect them so as to occupy the space provided by said groove, yet the shape and size of the latter (and of the thread parts correspondingly) may obviously be varied so long as they provide for pressing the separated parts together as described. Thus in Fig. 4 a double thread is provided on the bolt, the parts of which are separated by a dividing-groove of the same shape and size as the main groove, thereby forming a very wide divided thread and necessitating a considerable deflection of said parts in forcing the solid-threaded nut thereon, as shown; but as the parts of the divided thread are of the same height as the solid thread of the nut and not more than half the width or thickness of the solid engaging thread such deflection is readily effected, as I have found in actual practice with V-threads of United States standard proportions.

In Fig. 3 is shown a portion of a cutting-tool adapted for tapping the divided thread-nut of Figs. 1 and 2, said tool being provided with thread-dividing teeth $a^3$, differing in form or size from and located intermediate of the cutting-teeth $a^2$ for the main groove, and the combined areas of one of said dividing-teeth and one of said main teeth being equal to or slightly less than the divided tooth-forming grooves $b'\ b^2$. After tapping the nut with this tool in the ordinary manner I in some cases follow it with an additional operation to effect a preliminary closing together of certain of the divided threads, as indicated in Fig. 2, for the purpose of facilitating the starting of the nut upon the bolt by the thumb and finger, such operation consisting merely in forcing the nut to a limited distance upon a closing-tool which is threaded to correspond with the bolt upon which the nut is intended to be used. The divided thread may of course be formed upon the bolt instead of the nut, if desired, in a similar manner.

It will be seen that my invention provides for the employment of either a male or female screw of ordinary thread formation in connection with an engaging screw, the thread of which is forcibly closed together in service, so as to conform with said ordinary thread, while providing a positive and resilient gripping action.

What I claim is—

1. A screw having a divided thread the parts of which are capable of being pressed together to form an approximately solid thread.

2. A screw having a thread with yielding sides of normally greater spread than the intervening groove.

3. A screw having a thread with yielding sides of normally greater spread than the intervening groove and equally inclined to the axis around which the screw is formed.

4. A screw having a divided thread the parts of which are normally spread to form a wider thread than the groove between the threads.

5. A screw having a thread with yielding sides of normally greater spread than the intervening groove but capable of being pressed together so that the thread and groove will be substantially alike.

6. A screw having a thread the side walls of which are capable of being resiliently pressed together.

7. A screw having a laterally-closable thread of normally greater width than the intervening groove.

8. A screw having a double thread the parts of which are capable of being pressed together to form a single thread.

9. A bolt and nut both of which are screw-threaded to the same pitch, one with a single thread, and the other with a divided thread the separated parts of which are pressed together in forcing the nut upon the bolt.

10. A bolt and nut both of which are screw-threaded to the same pitch, one with a single thread, and the other with a divided thread the separated parts of which are pressed together in forcing the nut upon the bolt to form an approximately solid thread.

11. A bolt and nut both of which are screw-threaded to the same pitch, one with a single thread, and the other with a divided thread the separated parts of which are resiliently pressed together in forcing the nut upon the bolt.

12. A bolt and nut both of which are screw-threaded to the same pitch and one of which has its thread formed with yielding sides of normally greater spread than the intervening groove.

13. A bolt and nut both of which are screw-threaded to the same pitch, one with a single thread, and the other with a divided thread the parts of which are normally spread to form a wider thread than the groove between the threads.

14. A bolt and nut both of which are screw-threaded to the same pitch, one with a single thread, and the other with a divided thread the parts of which are normally spread to form a wider thread than the groove between the threads said parts being pressed together in forcing the nut upon the bolt so as to make the thread and groove substantially alike.

15. A bolt and nut both of which are screw-threaded to the same pitch and one of which has its thread formed with yielding sides of normally greater spread than the intervening groove and equal incline to the screw-axis.

16. A bolt and nut both of which are screw-threaded to the same pitch, one with a single thread, and the other with a divided thread the parts of which are equally inclined to the screw-axis and normally spread to form a wider thread than the groove between the threads.

17. A bolt and nut both of which are screw-threaded to the same pitch, one with a single thread and the other with a double thread, the combined cross-sectional areas of the two parts of the double thread being substantially the same as that of the single thread and said parts being pressed together in forcing the nut upon the bolt.

18. A screw having a divided thread the parts of which are separated by a groove of less size than the groove between the threads.

19. A screw having a divided thread the parts of which are separated by a V-groove of more acute angle than the V-groove between the threads.

In testimony whereof I affix my signature in the presence of two witnesses.

JOHN V. CULLINEY.

Witnesses:
  DAVID M. FRY,
  W. H. CASTNER.